US011005871B2

(12) United States Patent
Anakata et al.

(10) Patent No.: US 11,005,871 B2
(45) Date of Patent: May 11, 2021

(54) CLOUD-BASED ANOMALOUS TRAFFIC DETECTION AND PROTECTION IN A REMOTE NETWORK VIA DNS PROPERTIES

(71) Applicant: Avast Software s.r.o., Prague (CZ)

(72) Inventors: Joe Anakata, Alameda, CA (US); Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/245,042

(22) Filed: Jan. 10, 2019

(65) Prior Publication Data

US 2019/0215331 A1 Jul. 11, 2019

Related U.S. Application Data

(60) Provisional application No. 62/615,935, filed on Jan. 10, 2018.

(51) Int. Cl.
*H04L 29/08* (2006.01)
*H04L 29/06* (2006.01)
(Continued)

(52) U.S. Cl.
CPC ......... *H04L 63/1425* (2013.01); *G06N 20/00* (2019.01); *H04L 41/046* (2013.01);
(Continued)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

2011/0202665 A1* 8/2011 Barber .............. H04L 29/12066
709/227
2013/0232251 A1* 9/2013 Pauley ................ H04L 43/0876
709/224
(Continued)

FOREIGN PATENT DOCUMENTS

WO 2016164050 A1 10/2016

OTHER PUBLICATIONS

Global DNS Infrastructure—OpenDNS is the world's most intelligent DNS service, keeping you safe online and enabling you to connect to the Internet with confidence from anywhere., 5 pages, https://web.archive.org/web/20150912085717/https://www.opendns.com/about/global-dns-infrastructure/. Accessed Apr. 9, 2019.
(Continued)

*Primary Examiner* — Sharif E Ullah
(74) *Attorney, Agent, or Firm* — Erickson Kernell IP, LLC; William B. Kircher (57) ABSTRACT

A central platform remote from a local network can detect anomalies on the local network. The central platform can assign a unique pair of DNS server IP addresses to the local network. The central platform can receive configuration data from the local network and use the configuration data and the assigned pair of DNS server IP addresses to uniquely identify devices on the local network. In the case that current network flow statistics do not match expected network flow statistics for the local network, a device causing the anomalous behavior can be identified using the assigned pair of DNS server IP addresses and configuration data.

9 Claims, 5 Drawing Sheets

(51) Int. Cl.
  *H04L 29/12* (2006.01)
  *G06N 20/00* (2019.01)
  *H04L 12/24* (2006.01)
(52) U.S. Cl.
  CPC ...... *H04L 61/1511* (2013.01); *H04L 61/2007* (2013.01); *H04L 63/1416* (2013.01); *H04L 67/10* (2013.01); H04L 61/2514 (2013.01); H04L 63/1441 (2013.01)

(56) References Cited

U.S. PATENT DOCUMENTS

| | | | | | |
|---|---|---|---|---|---|
| 2013/0250801 | A1* | 9/2013 | Kennedy | ............. | H04L 41/0806 370/254 |
| 2014/0304378 | A1* | 10/2014 | Courtney | .......... | H04L 29/12066 709/220 |
| 2016/0381023 | A1* | 12/2016 | Dulce | ................ | H04L 63/1491 726/9 |
| 2017/0012932 | A1* | 1/2017 | Nichols | ................... | H04L 67/42 |
| 2017/0111389 | A1* | 4/2017 | Kasman | .............. | H04L 63/1458 |
| 2019/0215331 | A1* | 7/2019 | Anakata | ................ | H04L 41/046 |

OTHER PUBLICATIONS

OpenDNS—The OpenDNS Global Network Delivers a Secure Connection Every Time. Everywhere., 2014, 6 pages, OpenDNS, Inc.

Wlodarz, Derrick, How OpenDNS Works and Why it Can Benefit Your Customers, 8 pages, https://web.archive.org/web/20150526204238/https://www.technibble.com/how-opendns-works-and-why-it-can-benefit-your-customers/. Accessed Apr. 9, 2019.

Horowitz, Michael, OpenDNS provides added safety for free—You can be a bit safer on the Internet using OpenDNS rather than the DNS servers from your ISP., CNET, Dec. 19, 2007, 7 pages, CBS Interactive Inc., https://web.archive.org/web/20150212143847/http://www.cnet.com/news/opendns-provides-added-safety-for-free. Accessed Apr. 9, 2019.

* cited by examiner

CLOUD-BASED ANOMALOUS TRAFFIC DETECTION AND PROTECTION IN A REMOTE NETWORK VIA DNS PROPERTIES

CROSS-REFERENCE TO RELATED APPLICATIONS

This Application claims priority to U.S. Provisional Patent Application Ser. No. 62/615,935, filed on Jan. 10, 2018, entitled "CLOUD BASED DNS ANOMALY DETECTION AND PROTECTION,", the entire disclosure of which is incorporated herein by reference.

FIELD

The disclosure relates generally to network systems, and more particularly to detection and protection of devices in local networks from anomalies using cloud-based analysis of Domain Name System (DNS) and other network behaviors and/or properties.

BACKGROUND

Providing security for devices on a remote network, such as a home network or office network, can be difficult. One reason for the difficulty is that routers that serve as gateways between the remote network and an Internet Service Provider (ISP) are often assigned Internet Protocol (IP) addresses that are dynamic in nature. In other words, an IP address assigned to a particular router for a particular remote network may change over time. As a result, it can be difficult to characterize data streams flowing to and from a remote network, such as a home or office network, because the IP address associated with the data streams can change.

SUMMARY

In an aspect, the inventive subject matter provides cloud-based detection of, and protection from, anomalous network traffic from a gateway device that has a non-static IP address by configuring the gateway device to utilize a unique pair of static DNS nameservers.

Systems and methods enable anomaly detection in a local network by (i) maintaining, by a central platform, a plurality of DNS server IP addresses; (ii) receiving, by the central platform, configuration data for the local network; (iii) assigning, by the central platform, a pair of DNS server IP addresses to the local network, wherein the pair of DNS server IP addresses are selected to be unique within pairings of the plurality of DNS server IP addresses; and (iv) identifying, by the central platform, a device within the local network based, at least in part, on the configuration data and the pair of DNS server IP addresses assigned to the local network.

BRIEF DESCRIPTION OF THE DRAWINGS

For a better understanding of the inventive subject matter, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Many ISPs assign their customers' gateway devices dynamic IP addresses, which may change on a regular basis. For example, an IP address assigned to a gateway device of a particular customer may change on a daily, weekly, or monthly basis. Additionally, remotely identifying a device in a local area network (LAN), such as a home network, can be challenging because the devices are typically hidden behind a NAT (Network Address Translation) implemented at the LAN gateway router. The Internet Protocol address space is limited, and so each local area network in a home typically uses a local (i.e., "private") address space, for example, 192.168.1.x along with NAT. A router, access point, or other device serving as a gateway router employs NAT to allow any of the devices on the LAN to communicate with the broader Internet (i.e., public address space network). NAT accomplishes this by rewriting the IP address of every LAN device with the IP address of the gateway device (e.g., router, access point, etc.), and using Transmission Control Protocol (TCP) port numbers to demultiplex the traffic when it gets back.

Embodiments of the present invention can identify anomalous behavior of devices within a local network (e.g., a private address space network), with the identifying performed at one or more computing platforms remotely located from the local network. In some aspects, a gateway router is assigned a specific pair of DNS servers from a pool of available DNS servers. The unique DNS-server-pair assignment can enable an algorithm executing on one or more computing platforms remotely located from the gateway router (e.g., in the cloud) to identify network data sent by and/or addressed to the gateway router (i.e., each individual ISP customer). Once the gateway router is identified, the devices within the local network can be more easily identified and classified based on network traffic observed outside the local network (i.e., on the broader Internet, on the opposite side of the gateway router from the local network). For example, the central platform may identify and classify the local network devices based on a lookup algorithm, one or more machine learning algorithms (e.g., a machine learning engine, etc.), or the like. Based on the identified and/or classified devices, an appropriate machine learning profile can then be associated with the local network. This association of the appropriate machine learning profile can enable efficient anomaly detection algorithms to be used to detect, from the remotely located computing platform(s), when a device inside the local network has been compromised.

Figure 1:
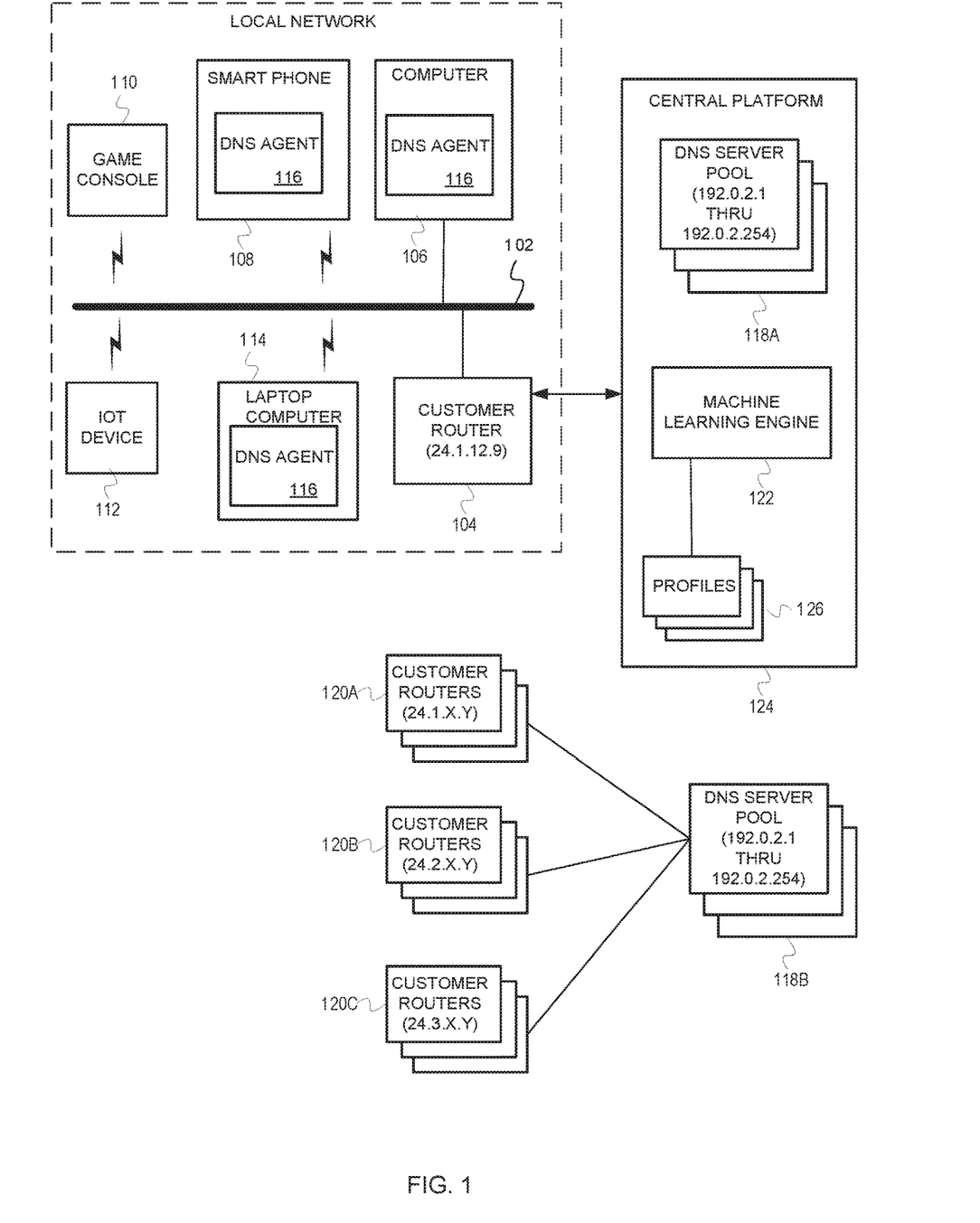
FIG. 1 is a block diagram illustrating an example system to perform cloud-based detection of, and protection from, anomalous network traffic in a remote network based on DNS properties.

FIG. 1 is a block diagram illustrating an example system 100 to perform cloud-based DNS anomaly protection. In some embodiments, system 100 can include a local network 102 having a router 104, computer 106, smartphone 108, game console 110, Internet of Things (IoT) device 112, and laptop computer 114. System 100 can further include a central platform 124 and customer routers 120A, 120B and 120C. The customer routers 120A, 120B and 120C may be connected to the same local network or to separate local networks. For example, each customer router 120A, 120B and 120C may transmit and receive network data to/from different ISP networks.

Local network 102 is capable of facilitating the exchange of data (e.g., network packets, etc.) among router 104, computer 106, smartphone 108, game console 110, IoT device 112, and laptop computer 114. Local network 102 can be a wired network, a wireless network, or a combination of the two. In some embodiments, local network 102 can be a home network. In alternative embodiments, network 102 can be a network in a small business or a corporate network. The local network 102 includes networks that utilize a private IP address space. Although the geographic scale/spatial scope of local network 102 is not limited, examples of networks that can comprise local network 102 include, but are not limited to, a nanoscale network, a near-field network, a body area network (BAN), a personal area network (PAN), a near-me area network (NAN), a local area network (LAN), a wireless local area network (WLAN), a home area network (HAN), a storage area network (SAN), and a campus area network (CAN). In other embodiments, local network 102 is any medium that allows data to be physically transferred through serial or parallel communication channels (e.g., copper wire, optical fiber, computer bus, wireless communication channel, etc.).

Computer 106 can be a desktop computer, a server computer, a set-top box, or any other device having a processor and memory enabling the device to execute programs.

Smartphone 108 can be any type of smartphone. Examples of smartphones include Android®-based smartphones, iPhones®, and Windows® phones. The embodiments are not limited to any particular type of smartphone.

Game console 110 is a specialized computing device typically designed to play video games. Nonlimiting examples of game consoles include the Microsoft Xbox® family of game consoles, the Sony Playstation® family of game consoles, and the Nintendo WII® family of game consoles.

IoT device 112 can be any type of device that includes a processor and a network interface to communicate data via local network 102. Examples of such devices include, but are not limited to, smart televisions, smart home appliances, sensors, biochips, office devices, implantable medical devices, and vehicle-based devices.

Laptop computer 114 can be a portable computing device, including traditional laptop computers or tablet computers.

Router 104 is a gateway device that transmits and receives network data (e.g., data packets, etc.) for devices on local network 102 to/from the customer's ISP network. Router 104 can be a standalone router, a wireless router or access point, a modem/router or any other device that forwards data between two networks. In some embodiments, router 104 is capable of forwarding data packets between a first network (e.g., local network 102) or subnetwork that utilizes a first addressing scheme, such as a private IP address space, and a second network (e.g., ISP network, broad network) or subnetwork that utilizes a second addressing scheme, such as a public IP address space. Router 104 typically is assigned a dynamic IP address by an ISP. In some embodiments, the first two octets of the dynamic IP address assigned to routers by an ISP do not change, while the second two octets may change as part of the dynamic assignment of IP addresses by the ISP. For instance, in the example illustrated in FIG. 1, router 104 has been assigned a dynamic IP address of 24.1.12.9 by the ISP. The ISP may assign a different IP address to router 104 at a later time, for example, 24.1.97.209. However, it would not be expected that the ISP would assign an IP address of 24.99.17.34 to router 104.

Central platform 124 can be a server (or multiple servers) that can provide provisioning, domain name, and analysis services for local networks such as local network 102. In some embodiments, central platform 124 can include a DNS nameserver pool 118A and a machine learning engine 122.

DNS nameserver pool 118A comprises a pool of DNS servers, each having an assigned IP address. In some embodiments, DNS nameserver pool 118A has 254 DNS servers available for assignment to local networks (e.g., local network 102). The DNS servers may all reside on a single server (e.g., central platform 124 or other server) or they can be distributed across multiple servers. In the example illustrated in FIG. 1, each DNS server in the DNS nameserver pool 118A can be assigned a unique address in the range of 192.0.2.1 through 192.0.2.254. The DNS nameserver pools may provide DNS servers to a plurality of local networks, as illustrated by DNS nameserver pool 118B and customer routers 120A, 120B, and 120C in FIG. 1. In some embodiments, the DNS nameserver pools store the DNS servers and assigned IP addresses thereof as computer-readable data values embodied in a tangible, non-transitory computer-readable medium of a computing platform (e.g., central platform 124, etc.).

In some embodiments, two unique DNS nameservers are statically assigned to each router in a group of 65,000 IP addresses managed by an ISP, where the IP address pair of the two DNS nameservers is unique within the group. By assigning two "unique" nameservers per group of 65,000 IP addresses, up to 31878 (=253×252/2) different customer routers can be differentiated within the group of 65,000 IP addresses. If the number of customer routers in a group of IP addresses is growing close to the limit, additional pools of DNS nameservers can be provisioned. The two unique DNS nameservers are assigned to the routers in a group such that each router is assigned a unique pair of DNS nameservers. Thus, a router 104 can be uniquely identified by determining the pair of the DNS nameservers that are used by router 104, even if the router's dynamically assigned IP address changes over time.

Machine learning engine 122 determines network flow statistics based on network traffic received from local network 102. Machine learning engine 122 can use the network flow statistics along with other data such as the network device list for a network (e.g., local network 102) to create a network profile 126 for the network and identify anomalous behavior (e.g., botnets, interne scanning, privacy leaks, etc.) on the network. In some embodiments, the machine learning engine 122 outputs at least a severity label and/or a classification confidence of identified anomalies. Machine learning engine 122 can be a component of central platform 124, or it can be a component of another system or platform such as a network security system, a network control system, a network intelligence platform, etc. In some embodiments, machine learning engine 122 and/or network profiles 126 can be comprised of one or more processor-executable instructions and/or computer-readable data values embodied in a tangible, non-transitory computer-readable medium of a computing platform (e.g., central platform 124, etc.) for implementing one or more machine learning algorithms when executed by a processor of a computing device.

Central platform 124 can be coupled to customer router 104 via any collection of one or more wired networks, wireless networks, or combinations of the two. In some aspects, the network communicably coupling central platform 124 to customer router 104 can be one or more networks that make up the Internet. In some embodiments, the network communicably coupling central platform 124 to routers (e.g., customer router 104) is referred to as an ISP network and/or a broad network. The network communicably coupling central platform 124 to routers includes networks that utilize a public IP address space. Although the geographic scale/spatial scope of the network communicably coupling central platform 124 to routers is not limited, examples of networks that can comprise this network include, but are not limited to, a backbone network, a metropolitan area network (MAN), a wide area network (WAN), a global area network (GAN), a public switched telephone network (PSTN), and an Internet area network (IAN). In another embodiment, the network is any medium that allows data to be physically transferred through serial or parallel communication channels (e.g., copper wire, optical fiber, computer bus, wireless communication channels, etc.).

In some embodiments, a device on local network 102 may optionally include an agent 116. Agent 116 can perform operations such as scanning local network 102 to identify and report devices on the local network 102 to central platform 124. This can enable the central platform 124 to support smarter filtering and detection of anomalous network behavior. However, it is noted that such an agent 116 is not a requirement of the embodiments, and a local network need not have any specialized software or hardware components installed to facilitate identification of network traffic and anomalous events. Agent 116 can be an application (e.g., processor-executable instructions embodied in a tangible, non-transitory computer-readable medium, etc.) that is downloaded to a user's smartphone, laptop computer, tablet computer, desktop computer, or other device on local network 102.

It should be noted that although only one local network 102 is illustrated in FIG. 1, a central platform 124 can receive data from many different local networks.

The number and types of devices illustrated in FIG. 1 is to be considered as an example. Those of skill in the art having the benefit of the disclosure will appreciate that a network 102 can include more or fewer devices and device types than that illustrated in FIG. 1.

Figure 2:
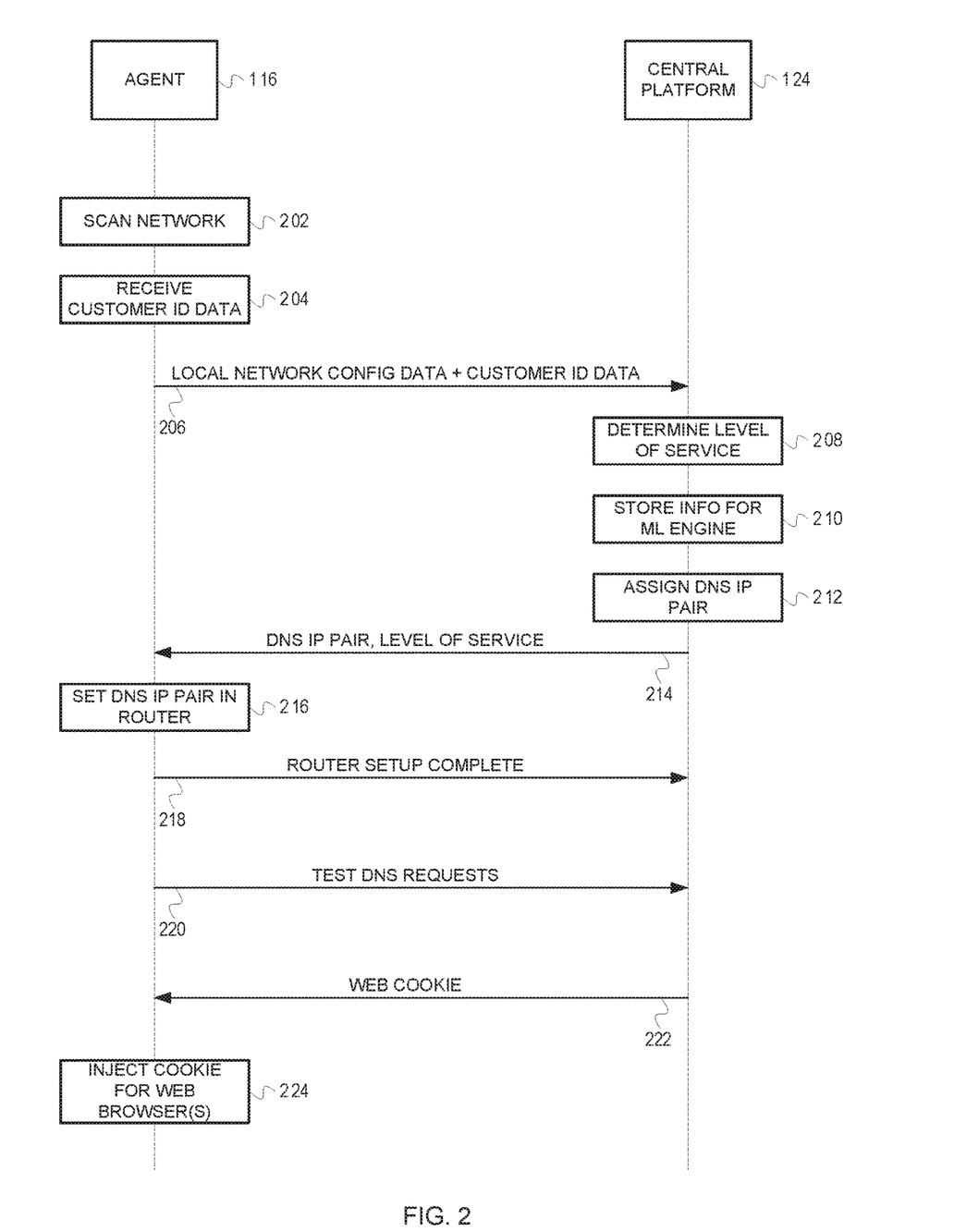
FIG. 2 is a sequence diagram illustrating operations of a method for provisioning in a system to perform cloud-based DNS anomaly protection.
Figure 3:
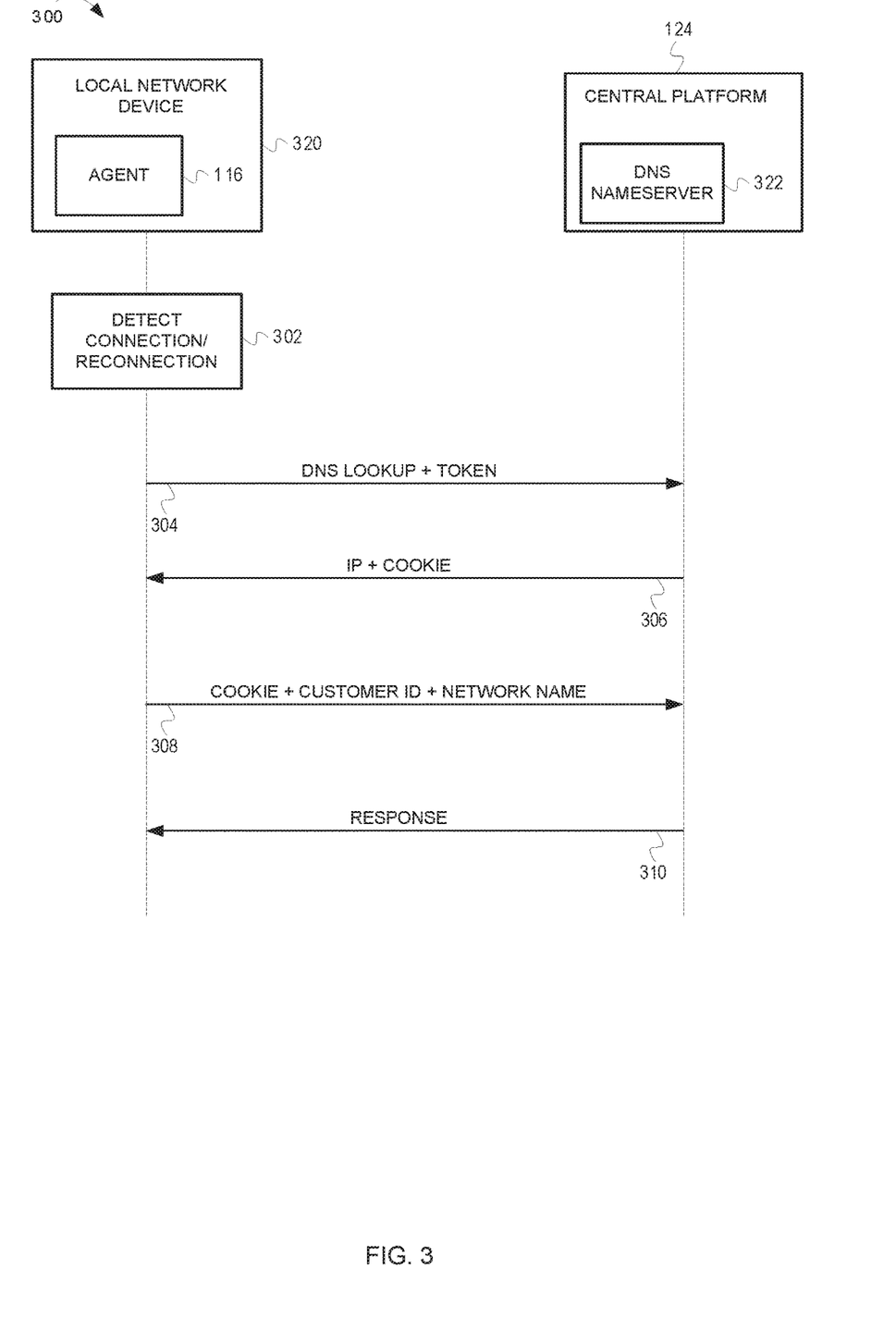
FIG. 3 is a sequence diagram illustrating operations of a method for updating a system to perform cloud-based DNS anomaly protection.
Figure 4:
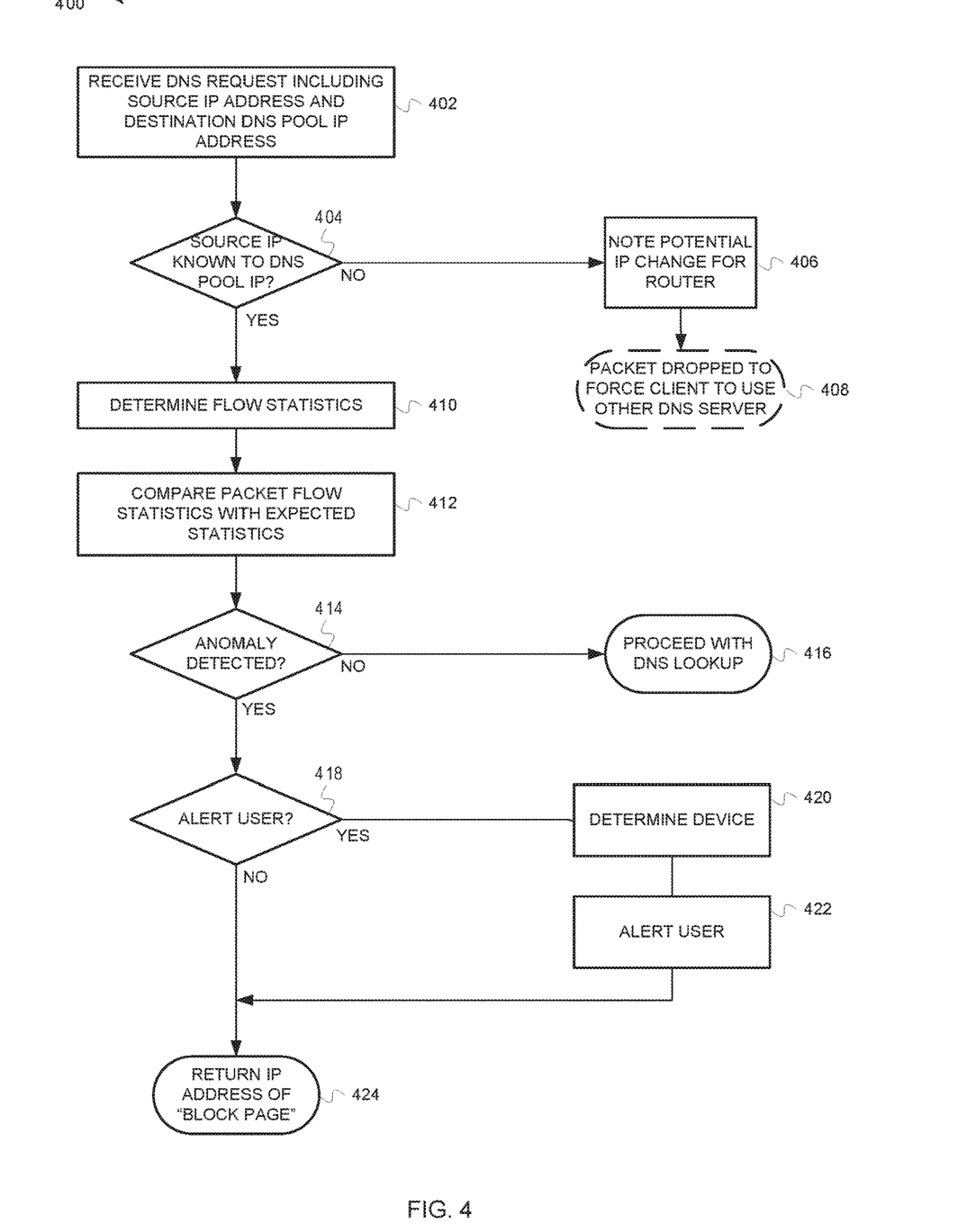
FIG. 4 is a flowchart illustrating operations of a method for cloud-based DNS anomaly protection.

Further details on the operation of the above described system 100 will now be presented with respect to FIGS. 2-4.

FIG. 2 is a sequence diagram 200 illustrating operations included in a method for provisioning in a system (e.g., system 100) to perform cloud-based DNS anomaly protection. In some embodiments, the operations may be performed by an agent 116 executing on a computing device (e.g., computer 106, etc.) on local network 102 and central platform 124.

At operation 202, the agent 116 can scan the local network 102 to determine a local configuration for local network 102. For example, the agent 116 can determine the devices currently present on the local network 102, along with information regarding the devices such as their local IP addresses and Media Access Control (MAC) addresses. In addition, the agent 116 can obtain information about the customer's router 104. For example, the agent 116 may obtain the model and/or MAC address of the router 104.

At operation 204, the agent 116 can receive customer identification data. The customer identification data can be an email address associated with the customer, a phone number associated with the customer, or other identifying information associated with the customer. In some embodiments, the customer identification data can be provided via a graphical user interface of a computing device on which agent 116 is executing.

At operation 206, the agent 116 sends the local configuration information and/or customer identification data to the central platform 124.

At operation 208, the central platform 124 can use the local configuration information to determine a level of service. For example, the central platform 124 may use the router model information and/or router MAC address to determine a level of service that the central platform 124 can provide to the devices connected on local network 102. For example, in some cases, a router 104 may reassign NAT port numbers, even when such reassignment is not necessary. This reassignment can make individual device detection more difficult. As a result, the central platform 124 may adjust its level of service accordingly. Additionally, in some cases, the mix of devices on local network 102 may include too many devices that do not use predictable port numbers or do not use DNS. This can make behavior analysis more difficult. Thus, the central platform 124 may adjust the level of service it can provide accordingly. In the above mentioned cases, the central platform 124 may indicate that it can provide blocking and/or anomaly detection for the local network 102, but not at an individual device level. Alternatively, the central platform 124 may indicate that some devices on the local network 102 cannot be protected. Additionally or alternatively, at operation 208, the central platform 124 can use the customer identification data to determine the level of service. For example, the central platform 124 may use the customer identification data to determine a protection level of service for the devices connected on local network 102, features to enable for the devices connected on local network 102, or the like.

At operation 210, the central platform 124 can store the local configuration information for local network 102. The stored information can be provided to the machine learning engine 122 for use in analyzing network behavior of local network 102. For example, machine learning engine 122 can use information representing the type of router 104 and/or type of devices connected on local network 102 to identify anomalous traffic on local network 102.

At operation 212, the central platform 124 can assign a pair of DNS nameservers from the DNS nameserver pool 118A to the router 104. Additionally, the central platform 124 can associate the assigned DNS server IP address pair with the customer record in profiles 126. In some embodiments, the system assigns completely unique pairs to the first customer networks (e.g., local networks 102) that are assigned pairs of DNS nameservers. That is, there is no overlap in the IP addresses of the assigned pairs. For example, the first 128 customer routers within a /16 block (e.g., a set of IP addresses having the same first two octets) can be assigned to completely unique pairs of DNS nameservers. Assignment of unique pairs can be desirable because it can aid in characterizing network flows. For example, use of unique pairs during the early assignment process can allow the machine learning engine 122 to more fully characterize the dynamic nature of a given IP block before assigning DNS nameservers with partially overlapping IP addresses (i.e. one IP shared with another customer router, but the pair being unique to that customer router within the block).

At operation 214, the central platform 124 provides the pair of IP addresses of the assigned DNS nameservers to the agent 116. Additionally, the central platform can also provide the level of service to be provided by the central platform 124.

At operation 216, the router 104 is configured to use the pair of IP addresses of the assigned DNS nameservers. In some embodiments, agent 116 can communicate with the router 104 to set the DNS nameservers' IP addresses in the router 104. In alternative embodiments, the DNS nameservers' IP addresses can be displayed or otherwise provided to the user, who can manually set the DNS IP addresses in router 104. In further alternative embodiments where the router supports EDNS (Extension mechanism for DNS), EDNS can be enabled in order to support EDNS MAC injection. Enabling EDNS can be desirable, because it cause the router to provide information to the central platform 124 that can make it easier for the central platform to identify the individual devices making DNS queries.

At operation 218, agent 116 can provide an indication to central platform 124 that the DNS server setup for the router 104 is complete.

At operation 220, the agent 116 can send two test DNS requests (one to each of the assigned DNS nameservers) with predetermined non-existent DNS names to verify the router setup. If there is no response to the DNS requests, the agent 116 can attempt to re-provision the router, or instruct the user to check the DNS settings and reset the router.

At operation 222, the central platform 124 can provide a token (e.g., a web cookie, etc.) to the agent 116 that can be used for browser-based access. In some embodiments, the web cookie can be a "long-lived" cookie.

At operation 224, the agent 116 causes a web browser application to be opened on the device with a link that will inject the web cookie into the browser to facilitate access later. For example, a long-lived cookie can be used that includes information on the confirmed DNS server IP address pair into a web access token. This can allow access through the browser even if the agent 116 is uninstalled or otherwise not operating.

As noted above, agent 116 is optional and may not be present in some embodiments. Thus, some of the operations described above may be replaced with operations performed by a user or administrator of local network 102. For example, if agent 116 is not present on the local network 102, then in some embodiments, a user or administrator of local network 102 can manually provision the IP addresses onto their router after obtaining them (e.g., through a sign up via a web page, etc.). Additionally, the user or agent can provide the e-mail address or other identifying information at sign up. Further, a pair of DNS server IP addresses may not be assigned until the identifying information is provided. Also, in some embodiments a web page with "special" domain names in the page can be used to verify correct setup of DNS server IP addresses for the customer router.

FIG. 3 is a sequence diagram 300 illustrating operations of a method for updating a system (e.g., system 100) to perform cloud-based DNS anomaly protection. The operations can be performed periodically to verify a current router 104 IP address.

At operation 302, an agent 116 on a local network device 320 (e.g., smartphone 108, tablet computer, laptop computer 114, etc.) detects that the local network device 320 has connected or reconnected to local network 102. In some embodiments, the agent 116 can verify that the local network device 320 has connected (or reconnected) to the local network 102 using a service set identifier (SSID) or router MAC address verification.

At operation 304, the agent 116 can send a DNS lookup request to the DNS nameserver 322 currently in use by router 104 (i.e., one of the pair of DNS nameservers assigned to the router 104). The request can include a token provided to the agent 116 by the central platform 124 as part of the initial setup. The token can be used to help verify that the source IP address is connected to either or both of the assigned DNS servers 118. For example, the token can be used to verify that the source IP address (i.e., the address as translated by NAT and seen by the central platform 124) currently belongs to the subscriber as identified using the token. In some embodiments, the request can be for an AAAA record from the DNS name server.

At operation 306, the DNS nameserver 322 provides a reply to the agent 116 with the requested IP address and a cookie. In some embodiments, the reply is in the form of an AAAA record, with the cookie provided as part of the record.

At operation 308, the agent 116 sends a message that includes the cookie, customer ID, and network name of local network 102 to the central platform 124. The customer ID can be the user email or phone number provided during the initial provisioning process. The customer ID can also represent the long term subscriber identity.

At operation 310, the central platform 124 provides a response to the message. The response can indicate that the verification is complete. Alternatively, the response may indicate that user action is needed. For example, the response may indicate that the router 104 needs to be re-provisioned with the assigned DNS server IP address pairs.

FIG. 4 is a flowchart 400 illustrating operations of a method for cloud-based DNS anomaly protection.

At block 402, a DNS nameserver (e.g., DNS nameserver 322) receives a DNS request for an IP address lookup. The request will include a source IP address (typically the router 104 IP address if NAT is in use) from the originating network (e.g., local network 102), and an ingress IP address of the DNS nameserver that is the recipient of the request.

At block 404, a check is made to determine if the source IP address is known to the DNS nameserver. In other words, the DNS nameserver can check to determine if it is the assigned DNS nameserver for the network 102 associated with the source IP address.

When the source IP address is not known to the DNS nameserver, then flow proceeds to block 406, where the DNS nameserver notes (e.g., via a flag, etc.) a potential IP address change for the router 104. The method then ends at block 408, where the packet, which contains the DNS request, is dropped in order to force the router 104 to use the other DNS nameserver assigned to the router 104. The other DNS nameserver can look for the note and use the existence of the note to verify the IP address change of the router. For example, after the other DNS nameserver receives a second DNS lookup request, and in response to determining that the source IP address is not associated with the other DNS nameserver and that the note exists (i.e., data exists indicating that the source IP address may be associated with an IP address change of the router 104 on the local network 102), the source IP address can be reassigned to the pair of DNS server IP addresses.

When the check at block 404 results in the DNS nameserver determining that the source IP address is known to the DNS nameserver, then the customer router 104 can be reliably identified.

At block 410, flow statistics for the local network 102 are determined. The flow statistics can be modeled based on the inspection of packets, by machine learning engine 122, that are sent to and/or from the local network 102. The statistics can include DNS queries, port numbers used in queries, IP sequence numbers, DNS sequence numbers, the domain names being looked up, packet sizes, etc. The statistics for a network 102 can be maintained in a profile (e.g., profiles 126) associated with a customer router 104.

At block 412, the current flow statistics for the network associated with the source IP address can be compared, by the DNS nameserver, with expected flow statistics. The expected flow statistics can be based on the mix and types of devices on the local network 102 and past network behavior of the network 102.

At block 414, a determination can be made, by the DNS nameserver, based on the comparison of current flow statistics with expected flow statistics as to whether an anomaly (e.g., botnets, interne scanning, privacy leaks, etc.) is detected for the local network 102 associated with the source IP address.

When an anomaly is not detected, then flow proceeds to block 416, where the method continues with the requested DNS lookup. The method then ends.

When an anomaly is detected, the flow proceeds to block 418 to determine if the user is to be alerted. In some embodiments, the severity of the anomaly can be used to determine if the user is to be alerted. For example, a machine learning engine (e.g., machine learning engine 122, etc.) may analyze the anomaly and include at least one output that assigns a severity label to the anomaly that can be interpreted by aspects of the central platform 124 for generating an alert to the user. Further, a confidence level associated with the anomaly detection can be used to determine if the user is to be alerted. For example, a machine learning engine (e.g., machine learning engine 122, etc.) may analyze the anomaly and include at least one output that assigns a confidence of the classification that can be interpreted by aspects of the central platform 124 for generating an alert to the user. When the user is to be alerted, flow proceeds to block 420. When the user is not to be alerted, flow proceeds to block 424.

At block 420, the device causing the detected anomaly is determined by the DNS nameserver. In some embodiments, the device can be determined using identification information associated with the device based on past DNS queries. For example, devices can be initially identified through other DNS queries the devices make, and then using the port number and/or DNS sequence number to correlate with previous queries.

In the embodiments with an agent 116 on the user's local network 102, the device information as given by the initial scan can be used by the determination algorithm. Alternatively, if the router 104 supports EDNS, then the device can be determined from the EDNS information added by the router 104 during DNS queries.

Additionally, the nature of the anomaly itself may indicate what device is in question. Over a large base of users (e.g., at least 1000), if an anomaly is seen only with users who are known to have a certain device on their network, then it can be determined that the anomaly is likely associated with that device.

At block 422, the user is alerted about the anomalous behavior. In some embodiments, the alert can comprise a push notification to agent 116, which can then cause an alert to be displayed to the user (e.g., via a graphical user interface of a computing device, etc.). In alternative embodiments, the alert can comprise a short message service (SMS) message or an e-mail sent to a computing device of the customer. Flow then proceeds to block 424.

At block 424, the IP address of a "block page" can be returned in response to the DNS lookup instead of the IP address associated with the domain name identified in the request. The block page can include information as to why the lookup was blocked. For example, the block page may provide information about the detected anomaly. The customer may choose to block certain sites for their household. The customer may also choose to block certain sites by device, as long as the system has been able to adequately identify the device.

After the IP address of the block page has been returned, the method ends.

As can be seen from the above, a cloud-based central platform can receive all DNS queries from a subscribed customer router. Based on the ingress IP and the /16 block associated with the source of the DNS request, the central platform can differentiate individual customer routers. Characterization done during the first 128 customers within a block can help the platform be able to maintain this identification even as the IP address of the customer router changes.

A customer router can be identified based on a source IP address of a DNS lookup, and a DNS nameserver assigned to handle DNS requests from the source IP address. DNS traffic can be modeled via computing devices executing machine learning algorithms to learn what traffic is anomalous for that customer router and/or local network. IP sequence numbers, DNS sequence numbers, and DNS source port numbers, as well as the domain names being looked up can help identify individual devices on the local network and correlate the traffic. The traffic can be correlated even if the IP address associated with a customer router changes over time.

Additional Aspects of Certain Embodiments

In some embodiments, a first DNS nameserver of an assigned pair can occasionally time out an incoming DNS request in order to "force" the second DNS nameserver of the assigned pair to be used by the client router (e.g., customer router 104). This is desirable as it can aid in identifying and/or verifying the customer router associated with a DNS traffic flow through the pair of DNS nameservers.

As discussed above, in some embodiments, a network characterization phase can occur during when a DNS nameserver pool 118 is first initiated. During this phase, for the first 128 initiated customer routers per /16 IP block (e.g. the first 128 customer routers whose household IPs are 24.12.x.y), characterization of the "dynamicness" of the block can be seeded.

The "dynamicness" can comprise three types in some embodiments:
Long-term dynamic (IP addresses rarely change (e.g., change on a scale of less frequently than once a month, etc.))
Short-term dynamic (IP Addresses change within the scale of a month/week, i.e., when the customer resets their device)
Periodic dynamic (All Customers change their IP at a specific time)

In some embodiments, the machine learning engine 122 can use the following raw data parameters: Timestamp, Customer ID, IP Address, Confidence. The Confidence can initially be set to a value of one ("1") when there are 128 or fewer subscribers in the IP block and the system assigns unique DNS nameservers (i.e., no overlap in IP addresses of the DNS nameserver pairs), where a value of one indicates total confidence.

The raw data parameters can be transformed into data in the following form: Customer ID, First three octets of IP address, Start Hour, Start Day of Week, Start Day of Month, Duration, Confidence The machine learning engine 122 can then determine clustering of the data around any of these fields. For instance, an ISP which changes all IP addresses of customer routers at 4 am would show a strong cluster of the Start Hour field; similar clustering of the Start Day of Week field and the Start Day of Month field would occur for ISPs resetting on a day of the week or month, respectively. Alternatively, an ISP which simply limits the maximum duration of an IP address lease to a router 104 may show a cluster around that duration. In some embodiments, the first three octets of the IP address are included in case an ISP segments customer routers in blocks differently (for instance, all statically assigned IP addresses are of the form 24.12.250.x).

The clusters of IP address blocks can provide an indication to the classification algorithm about how much weight to assign to the stability of an IP address. For instance, if an IP address belongs to a stable cluster, the anomaly detection algorithm can have high confidence (e.g., greater than 95%, etc.) about the IP assignment. On the other hand, if an anomaly is detected in a home (e.g., local network 102) belonging to a frequently changing cluster, this could be because the IP address has changed and the model is simply seeing data from another household.

The output of this clustering model by the machine learning engine 122 manifests itself as a characterization of the IP address stability, and becomes an input to the machine learning detection model as one or more features (e.g. IP address stability, IP address age estimate). The anomaly detection model can then be trained to learn the effect of this feature. This is desirable in order to dampen false positives.

Additionally, in some embodiments, the original IP address stability clustering can continue to run even after the first 128 customer routers in a block are assigned, but with a decreasing "confidence" value based on how much overlap exists in the assigned DNS server addresses for a given observed incoming IP address pair. Thus, new observations of stability can continue to influence the clustering, but with less weight than the original observations.

Figure 5:
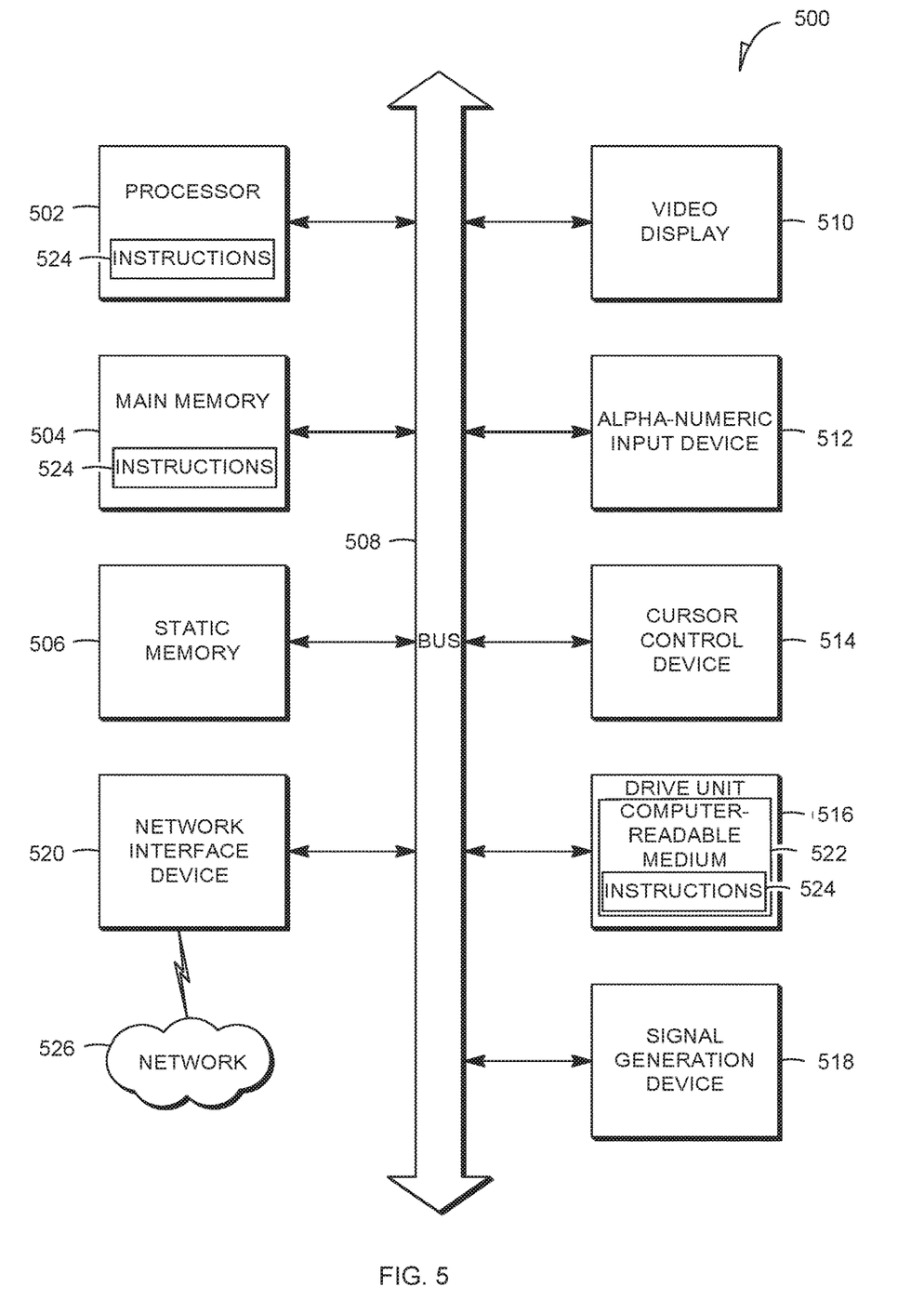
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. For example, computer system 500 may comprise, in whole or in part, aspects of central platform 124, computer 106, smartphone 108, game console 110, IoT Device 112, laptop computer 114, and local network device 320. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

In an aspect, a method for anomaly detection in a local network (e.g., local network 102) includes a central platform (e.g., central platform 124) maintaining a plurality of DNS server IP address (e.g., in a DNS server pool 118A). The method includes the central platform receiving (e.g., operation 206) configuration data for the local network and assigning (e.g., operation 212) a pair of DNS server IP addresses to the local network. The pair of DNS server IP addresses assigned to the local network are selected to be unique within pairings of the plurality of maintained DNS server IP addresses. The central platform identifies a device (e.g., customer router 104, computer 106, smartphone 108, game console 110, IoT device 112, laptop computer 114, etc.) within the local network based, at least in part, on the configuration data and the pair of DNS server IP addresses assigned to the local network. In some embodiments, an IP address assigned to the local network (e.g., a router 104 on the network, etc.) is dynamic (i.e., the IP address changes over time). The dynamic nature of the IP address prevents identifying devices within the local network based on the IP address because of the changes over time. Thus, the assigned pair of DNS server IP addresses are used to identify devices within the local network despite the IP address of the local network changing over time.

In some embodiments, the central platform can provide (e.g., operation 222) a token to an agent (e.g., agent 116) on the local network and receive a DNS lookup request (e.g., operation 304, operation 402, etc.) from the agent. The DNS lookup request can include information from the token. The central platform can determine (e.g., operation 404), based at least in part on the information from the token and an IP address of a DNS server receiving the DNS lookup request, that the local network is correctly assigned to the pair of DNS server IP addresses.

In further embodiments, a first DNS server of the central platform that has a first IP address of the pair of DNS server IP addresses can receive (e.g., operation 402) a first DNS lookup request. The central platform can determine (e.g., operation 404) whether a source IP address associated with the DNS lookup request is associated with the first DNS server. In response to determining that the source IP address is not associated with the first DNS server, the central platform can drop (e.g., operation 408) the first DNS lookup request and create data (e.g., operation 406) indicating that the source IP address may be associated with an IP address change of a router (e.g., router 104) on the local network.

In yet further embodiments, a second DNS server of the central platform that has a second IP address of the pair of DNS server IP addresses can receive a second DNS lookup request. The central platform can determine whether the source IP address is associated with the second DNS server. In response to determining that the source IP address is not associated with the second DNS server and that data exists indicating that the source IP address may be associated with an IP address change of the router on the local network, the central platform can reassign the source IP address to the pair of DNS server IP addresses.

In further embodiments, the central platform can receive (e.g., operation 402) a DNS lookup request from a device on the local network and determine (e.g., operation 404), based at least in part on a source IP address of a DNS server receiver receiving the DNS lookup request, the local network associated with the DNS lookup request. The central platform can also determine (e.g., operation 410) current flow statistics for the local network. A machine learning engine (e.g., machine learning engine 122) of the central platform can determine (e.g., operation 414) an anomaly in the local network based, at least in part, on comparing (e.g., operation 412) the current flow statistics with expected flow statistics.

In yet further embodiments, the machine learning engine can determine (e.g., operation 420) a device on the local network causing the anomaly based, at least in part, on at least one member of the group consisting of the configuration data for the local network, a port number in the source IP address, and a DNS sequence number.

In another aspect, a system includes a network interface (e.g., network interface device 520), at least one processor (e.g., processor 502), and at least one non-transitory computer-readable storage medium (e.g., main memory 504) connected by a bus (e.g., bus 508). The network interface is configured to communicatively connect the system to a broad network (e.g., an ISP network). The at least one non-transitory computer-readable storage medium is configured to store one or more data values for maintaining a plurality of DNS server IP addresses (e.g., in a DNS server pool 118A). The at least one non-transitory computer-readable storage medium also stores one or more processor-executable instructions (e.g., instructions 524) that, when executed by the at least one processor, provide a central platform (e.g., central platform 124). The central platform is configured to receive (e.g., operation 206) configuration data for a local network (e.g., local network 102) that is communicatively coupled to the broad network via a gateway router (e.g., customer router 104). The central platform is also configured to assign (e.g., operation 212) a pair of DNS server IP addresses to the gateway router such that DNS lookup requests from the local network are routed to at least one of the assigned pair of DNS server IP addresses. The assigned pair of DNS server IP addresses are unique within pairings of the maintained plurality of DNS server IP addresses. The central platform is further configured to identify a computing device (e.g., customer router 104, computer 106, smartphone 108, game console 110, IoT device 112, laptop computer 114, etc.) within the local network based, at least in part, on the configuration data and the pair of DNS server IP addresses assigned to the gateway router.

In yet another aspect, a non-transitory computer readable storage medium (e.g., machine-readable medium 522) includes a set of instructions (e.g., instructions 524) executable by a computer. The non-transitory computer readable storage medium includes instructions for maintaining, by a central platform (e.g., central platform 124), a plurality of DNS server IP addresses (e.g., in a DNS server pool 118A). The non-transitory computer readable storage medium further includes instructions for receiving (e.g., operation 206), by the central platform, configuration data for a local network (e.g., local network 102) and assigning (e.g., operation 212), by the central platform, a pair of DNS server IP addresses to the local network. The pair of DNS server IP addresses assigned to the local network are selected to be unique within pairings of the plurality of maintained DNS server IP addresses. The non-transitory computer readable storage medium further includes instructions for identifying, by the central platform, a device (e.g., customer router 104, computer 106, smartphone 108, game console 110, IoT device 112, laptop computer 114, etc.) within the local network based, at least in part, on the configuration data and the pair of DNS server IP addresses assigned to the local network. In some embodiments, an IP address assigned to the local network is dynamic, which prevents identifying the device within the local network based on the assigned IP address because the assigned IP address changes over time.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for anomaly detection in a local network, the method comprising:
   maintaining, by a central platform, a plurality of DNS server IP addresses, wherein the central platform is remotely located from the local network;
   receiving, by the central platform, configuration data for the local network;
   receiving, by the central platform, a DNS lookup request from a device on the local network;
   determining, by the central platform, based at least in part on a source IP address of the DNS lookup request and an IP address of a DNS server receiving the DNS lookup request, the local network associated with the DNS lookup request;
   determining, by the central platform, current flow statistics for the local network;
   determining, by a machine learning engine of the central platform, an anomaly in the local network based, at least in part, on comparing the current flow statistics with expected flow statistics; and
   determining, by the machine learning engine, a device on the local network causing the anomaly based, at least in part, on at least one member of the group consisting of the configuration data for the local network, a port number in the source IP address, and a DNS sequence number;
   assigning, by the central platform, a pair of DNS server IP addresses to the local network, wherein the pair of DNS server IP addresses is comprised of two DNS server IP addresses of the plurality of DNS server IP addresses, and wherein the pair of DNS server IP addresses are selected to be unique within pairings of the plurality of DNS server IP addresses; and identifying, by the central platform, a device within the local network based, at least in part, on the configuration data and the pair of DNS server IP addresses assigned to the local network.

2. The method of claim 1, further comprising:

providing, by the central platform, a token to an agent on the local network;

receiving, by the central platform, a DNS lookup request from the agent, the DNS lookup request including information from the token; and determining, by the central platform, based at least in part on the information from the token and an IP address of a DNS server receiving the DNS lookup request, that the local network is correctly assigned to the pair of DNS server IP addresses.

3. The method of claim 1, further comprising:

receiving, by a first DNS server of the central platform having a first IP address of the pair of DNS server IP addresses, a first DNS lookup request; and in response to determining, based at least in part on a source IP address associated with the first DNS lookup request, that the source IP address is not associated with the first DNS server, dropping the first DNS lookup request and creating data indicating that the source IP address may be associated with an IP address change of a router on the local network.

4. The method of claim 3, further comprising:

receiving, by a second DNS server of the central platform having a second IP address of the pair of DNS server IP addresses, a second DNS lookup request; and in response to determining that the source IP address is not associated with the second DNS server and that data exists indicating that the source IP address may be associated with an IP address change of the router on the local network, reassigning the source IP address to the pair of DNS server IP addresses.

5. The method of claim 1, wherein an IP address assigned to the local network is dynamic, thereby preventing identifying the device within the local network based on the assigned IP address as the assigned IP address changes over time.

6. A non-transitory computer readable storage medium comprising a set of instructions executable by a computer, the non-transitory computer readable storage medium comprising:

instructions for maintaining, by a central platform, a plurality of DNS server IP addresses, wherein the central platform is remotely located from the local network;

instructions for receiving, by the central platform, configuration data for the local network;

instructions for assigning, by the central platform, a pair of DNS server IP addresses to the local network, wherein the pair of DNS server IP addresses is comprised of two DNS server IP addresses of the plurality of DNS server IP addresses, and wherein the pair of DNS server IP addresses are selected to be unique within pairings of the plurality of DNS server IP addresses;

instructions for receiving, by the central platform, a DNS lookup request from a device on the local network;

instructions for determining, by the central platform, based at least in part on a source IP address of the DNS lookup request and an IP address of a DNS server receiving the DNS lookup request, the local network associated with the DNS lookup request;

instructions for determining, by the central platform, current flow statistics for the local network; and instructions for determining, by a machine learning engine of the central platform, an anomaly in the local network based, at least in part, on comparing the current flow statistics with expected flow statistics;

instructions for determining, by the machine learning engine, a device on the local network causing the anomaly based, at least in part, on at least one member of the group consisting of the configuration data for the local network, a port number in the source IP address, and a DNS sequence number; and instructions for identifying, by the central platform, a device within the local network based, at least in part, on the configuration data and the pair of DNS server IP addresses assigned to the local network, wherein an IP address assigned to the local network is dynamic, thereby preventing identifying the device within the local network based on the assigned IP address as the assigned IP address changes over time.

7. The non-transitory computer readable storage medium of claim 6, further comprising:

instructions for providing, by the central platform, a token to an agent on the local network;

instructions for receiving, by the central platform, a DNS lookup request from the agent, the DNS lookup request including information from the token; and instructions for determining, by the central platform, based at least in part on the information from the token and an IP address of a DNS server receiving the DNS lookup request, that the local network is correctly assigned to the pair of DNS server IP addresses.

8. The non-transitory computer readable storage medium of claim 6, further comprising:

instructions for receiving, by a first DNS server of the central platform having a first IP address of the pair of DNS server IP addresses, a first DNS lookup request; and instructions for, in response to determining, based at least in part on a source IP address associated with the first DNS lookup request, that the source IP address is not associated with the first DNS server, dropping the first DNS lookup request and creating data indicating that the source IP address may be associated with an IP address change of a router on the local network.

9. The non-transitory computer readable storage medium of claim 8, further comprising:

instructions for receiving, by a second DNS server of the central platform having a second IP address of the pair of DNS server IP addresses, a second DNS lookup request; and instructions for, in response to determining that the source IP address is not associated with the second DNS server and that data exists indicating that the source IP address may be associated with an IP address change of the router on the local network, reassigning the source IP address to the pair of DNS server IP addresses.

* * * * *